(12) United States Patent
Lutz et al.

(10) Patent No.: US 10,082,245 B2
(45) Date of Patent: Sep. 25, 2018

(54) TIME-OF-FLIGHT SAFETY PHOTOELECTRIC BARRIER AND METHOD OF MONITORING A PROTECTIVE FIELD

(71) Applicant: Rockwell Automation Safety AG, Landquart (CH)

(72) Inventors: Eric Lutz, Vilters (CH); Carl Meinherz, Malans (CH); Martin Hardegger, Sargans (CH)

(73) Assignee: Rockwell Automation Safety AG (CH)

( * ) Notice: Subject to any disclaimer, the term of this patent is extended or adjusted under 35 U.S.C. 154(b) by 163 days.

(21) Appl. No.: 15/096,797

(22) Filed: Apr. 12, 2016

(65) Prior Publication Data
US 2016/0298809 A1   Oct. 13, 2016

(30) Foreign Application Priority Data
Apr. 13, 2015   (EP) .................................. 15163320

(51) Int. Cl.
*F16P 3/14* (2006.01)
*G01V 8/22* (2006.01)
(Continued)

(52) U.S. Cl.
CPC .............. *F16P 3/144* (2013.01); *G01S 7/497* (2013.01); *G01S 17/026* (2013.01); *G01S 17/08* (2013.01);
(Continued)

(58) Field of Classification Search
CPC ... F16P 3/144; G01V 8/20; G01V 8/22; G01S 7/497; G01S 17/87; G01S 17/026; G01S 17/08
See application file for complete search history.

(56) References Cited

U.S. PATENT DOCUMENTS

2005/0007348 A1   1/2005   Waschke et al.
2008/0285842 A1*  11/2008  Plasberg ............... G01S 17/026
                                                          382/154
2010/0128248 A1   5/2010   Heizmann

FOREIGN PATENT DOCUMENTS

DE          197575595 A1      7/1999

OTHER PUBLICATIONS

European Search Report: EP Application No. 15163320.3; dated Sep. 22, 2016.

* cited by examiner

*Primary Examiner* — Tony Ko
(74) *Attorney, Agent, or Firm* — Boyle Fredrickson, SC

(57) ABSTRACT

The present invention relates to a safety photoelectric barrier for monitoring a protective field and to a corresponding method. A safety photoelectric barrier (100) comprises a single-sided transceiver bar with a housing (102), a plurality of transceiver modules (104) each having a radiation emitting unit (112) for emitting radiation towards a reference target (108), a radiation detecting unit (114) for detecting radiation incident on the transceiver module (104), and a signal processing unit for evaluating the detected radiation regarding a distance information and an intensity information and for generating a binary output signal indicating the presence or absence of an object within the protective field. A controller module (126) evaluates the binary output signals and generates a safety signal in response to the evaluated output signals. The radiation detecting unit comprises at least a first and a second photosensitive element (114) for redundantly evaluating the distance and intensity information.

18 Claims, 8 Drawing Sheets

(51) Int. Cl.
*G01S 17/02* (2006.01)
*G01S 17/08* (2006.01)
*G01S 17/87* (2006.01)
*G01S 7/497* (2006.01)
*G01V 8/20* (2006.01)

(52) U.S. Cl.
CPC ................ *G01S 17/87* (2013.01); *G01V 8/20* (2013.01); *G01V 8/22* (2013.01)

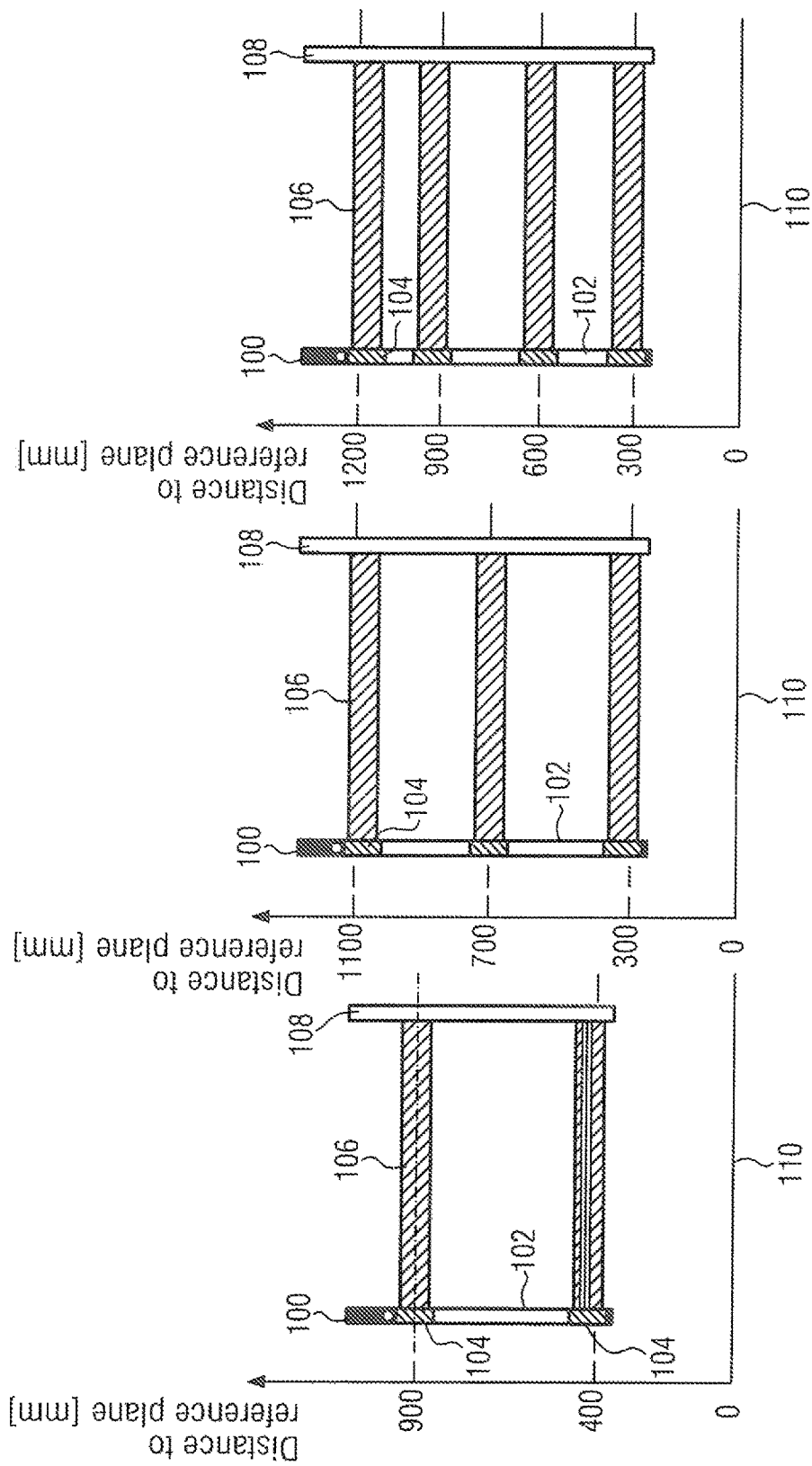

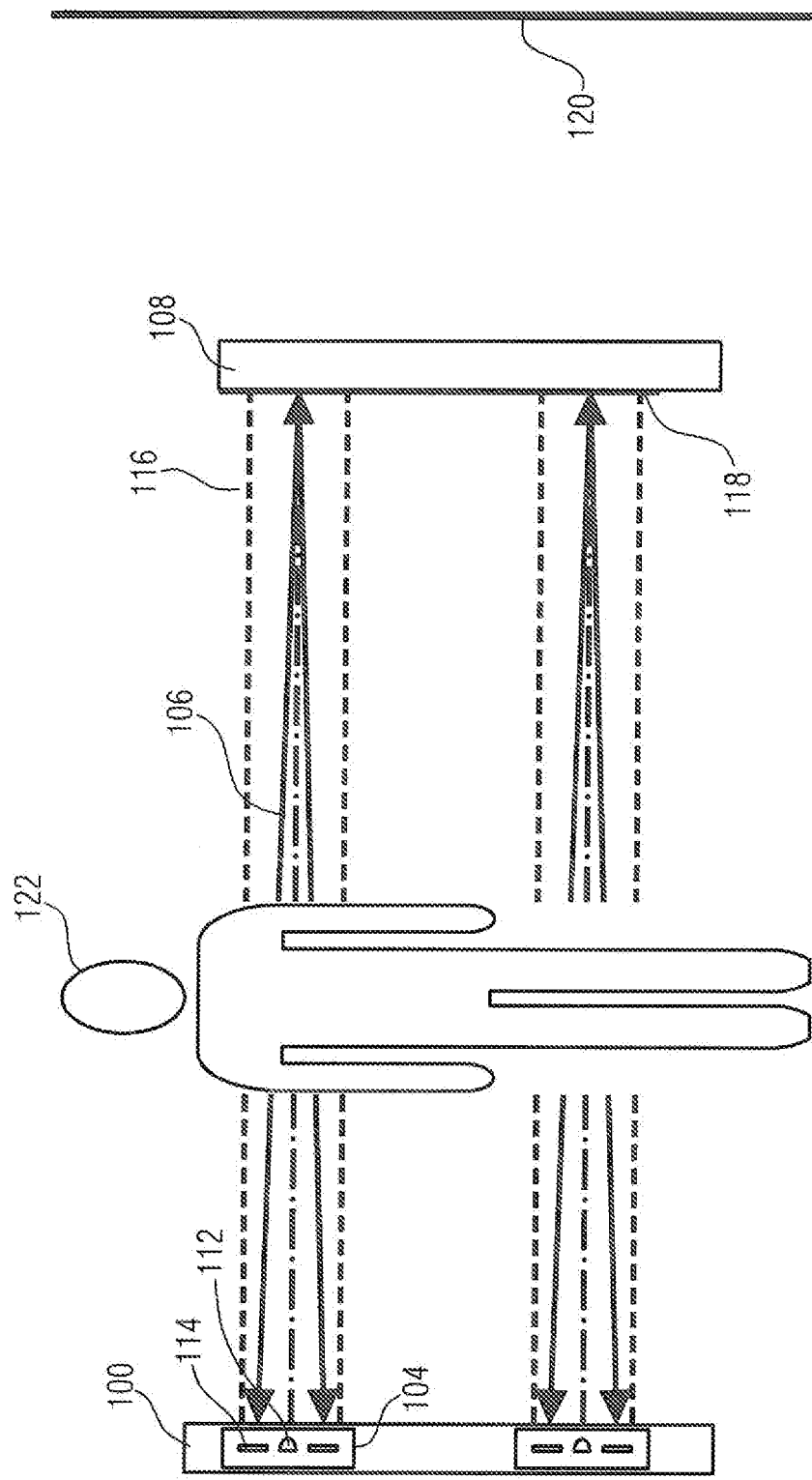

TIME-OF-FLIGHT SAFETY PHOTOELECTRIC BARRIER AND METHOD OF MONITORING A PROTECTIVE FIELD

STATEMENT REGARDING FEDERALLY SPONSORED RESEARCH OR DEVELOPMENT

--

CROSS REFERENCE TO RELATED APPLICATION

This application claims the benefit of European patent application EP 15163320.3 filed Apr. 13, 2015, and hereby incorporated by reference.

BACKGROUND OF THE INVENTION

The present invention relates to a safety photoelectric barrier for monitoring a protective field and to a corresponding method of monitoring the protective field.

Photoelectric barriers which are formed by one or more radiation beams are usually also referred to as light curtains, light grids or light barriers. Safety photoelectric barriers detect the movement or intrusion of objects, in particular persons, into guarded zones and may provide protection for human operators who are working with machines or other industrial equipment. Other light curtain systems are designed to control and monitor industrial automation processes and are in particular used for verifying assembly processes, counting objects, confirming an ejection process, recognize leading edges of transported goods, recognizing irregular shapes and a lot of other applications.

Safety photoelectric barriers employing infrared or visible light beams are used to provide operator safety by perimeter access control (PAC) in a variety of industrial applications. In particular, the operator protection around machinery, such as punch presses, guillotines, molding machines, automatic assembly equipment, coil winding machinery, robot operation, casting operations and the like can be ensured by using photoelectric barriers. Conventional light curtains typically employ light emitting diodes (LED) mounted at spaced positions along a transmitter bar at one side of the guarded zone, and phototransistors (PT), photodiodes or other photo receivers mounted along a receiver bar at the opposite side of the zone. The LEDs transmit modulated radiation beams along separate parallel channels to the PTs at the receiver bar. If one or more beams are blocked from penetration by an opaque object, such as the operator's body, the control circuit generates a safety signal that shuts down the machine, prevents the machine from cycling, or otherwise safeguards the area.

As mentioned above, such an interruption of the beam can also be used for counting objects or verifying the entrance of goods through defined areas.

It has to be noted in this context that the term "LED" sometimes is only intended to signify diodes that emit light in the visible spectrum, whereas diodes emitting infrared radiation are called IRED (infrared radiation emitting diode). However, in connection with the present invention, the term LED is intended to generally cover radiation emitting diodes irrespective of the wavelength of the emitted spectrum.

Usually, PAC photoelectric barriers comprise two active optical units, often called bars, sticks or strips, which are formed as two different constructional units, one of the optical units having the function of an emitter and one of a receiver. This architecture of an active emitter and receiver, however, has several drawbacks. Firstly, the fabrication costs are high, because both sides of the photoelectric barrier comprise expensive active components. Moreover, the installation is time consuming because the emitters and receivers have to be aligned accurately with respect to each other. Furthermore, both sides of an active-active photoelectric barrier have to be connected to the electric power supply and safety outputs.

In order to overcome these drawbacks, it is known from U.S. Pat. No. 7,034,950 B2 to form a laser grid by a single-sided arrangement in which the transmitting and receiving elements are combined into punctiform sensor units that each have at least one laser diode and two photosensitive pixels and that are arranged in line within a housing. According to this document, the distance of an intruding object is measured and a processing logic circuit is provided that is configured to logically combine the measured values of the plurality of the sensor units and to detect a size of an object from the combined values.

However, this conventional arrangement is not able to fulfill the safety requirements of safety integrity level 3 (SIL 3) as defined by the international standards IEC/EN 62061: 2005, IEC/EN 61508:2010, and IEC/EN 61511:2003. In particular, IEC/EN 62061, "Safety of machinery: Functional safety of electrical, electronic and programmable electronic control systems," is the machinery specific implementation of IEC/EN 61508. It provides requirements that are applicable to the system level design of all types of machinery safety-related electrical control systems and also for the design of non-complex subsystems or devices. The risk assessment results in a risk reduction strategy which in turn, identifies the need for safety-related control functions. These functions must be documented and must include a functional requirements specification and a safety integrity requirements specification.

The functional requirements include details like frequency of operation, required response time, operating modes, duty cycles, operating environment, and fault reaction functions. The safety integrity requirements are expressed in levels called safety integrity levels (SIL). Depending on the complexity of the system, some or all of the following elements must be considered to determine whether the system design meets the required SIL: Probability of Dangerous Failure per Hour ($PFH_D$), Hardware Fault Tolerance, Safe Failure Fraction (SFF), Proof Test Interval ($T_1$), Diagnostic Test Interval ($T_2$), Susceptibility to Common Cause Failures (ß), and Diagnostic Coverage (DC).

There are four discrete safety integrity levels, SIL 4 being the highest and SIL 1 being the lowest level of safety integrity.

The problem underlying the present invention is to provide an improved safety photoelectric barrier that is economic to fabricate and easy to install, but on the other hand fulfills at least the requirements of safety integrity level 3.

SUMMARY OF THE INVENTION

This problem is solved by the subject matter of the independent claims. Advantageous improvements are the subject matter of the dependent claims.

According to the present invention, a safety photoelectric barrier for monitoring a protective field comprises only one single-sided transceiver bar forming the only active element of the photoelectric barrier. The transceiver bar comprises a housing, a plurality of transceiver modules, and a controller module.

Each of the transceiver modules comprises a radiation emitting unit for emitting radiation towards a reference target. The protective field is located between the transceiver bar and the reference target. Furthermore, a radiation detecting unit is provided for detecting radiation incident on the transceiver module. A signal processing unit evaluates the detected radiation regarding a distance information and an intensity information. The signal processing unit generates a binary output signal indicating the presence or absence of an object within the protective field. The controller module evaluates the binary output signal generated by the transceiver modules and generates a safety signal in response to the evaluated output signals.

Such an arrangement forms a so-called time-of-flight system, where modulated radiation is sent out by a transmitter, and wherein the information about the distance is extracted from the time delay of the backscattered radiation.

3-D cameras or sensors based on the TOF principle acquire distance information from objects in a scene being imaged. Distance information is produced independently at each pixel of the camera sensor. A TOF system emits optical energy and determines how long it takes until at least some of that energy reflected by a target object arrives back at the system to be detected. Emitted optical energy traversing to more distant surface regions of a target object before being reflected back towards the system will define a longer TOF, than if the target object were closer to the system. If a round trip TOF is denoted t, then the distance d between the target object and the TOF time can be calculated as d=t·c/2, with c being the velocity of light.

Such known systems can acquire both luminosity data (signal amplitude) and TOF distance data and can produce three-dimensional images of a target object in real time.

Rather than directly measuring a time of flight directly, which requires very sensitive imaging equipment, a more sophisticated principle is based on a phase measuring TOF principle. Here, instead of directly measuring a light pulse's total trip, the phase difference between sent and received signals is determined. When modulating the transmitted light with a modulation frequency FM, the distance between the point of reflection and the camera can be calculated as $$d = \frac{c}{2f_m} \cdot \frac{\varphi}{2\pi} \qquad (1)$$

The detection of the reflected light signals over multiple locations in a system pixel array results in measurement signals that are referred to as depth images. The depth images represent a three-dimensional image of the target object surface.

According to the present invention, the radiation detecting unit of each transceiver module comprises at least a first and the second photosensitive element for redundantly evaluating the distance and intensity information.

A significant advantage of such an arrangement can be seen in the fact that only one active transceiver bar is needed. Consequently, the costs for manufacturing the photoelectric barrier are reduced. The alignment with respect to a passive reference target is much less complex than the alignment between two conventional active light curtain bars.

By evaluating two measured parameters, namely the distance information and the intensity information, and by furthermore evaluating this information redundantly by means of at least a first and second photosensitive element, a sufficiently high level of safety integrity can be reached.

Advantageously, according to the present invention, a reference target with any arbitrary reflectivity and geometry can be used. Especially at shorter operating ranges, e. g. up to 5 m, this is a significant advantage because a. the space for inserting a second light curtain bar might be too small, b. the alignment time of a second light curtain is reduced to zero, and c. the possibility of misaligning said second light curtain is also reduced to zero.

Furthermore, if a particularly specified target had to be used, there would be an additional risk that the target might become damaged and cause an unwanted down time of a guarded machine.

According to the present invention, the photosensitive elements can be formed by a charge coupled device, CCD, sensor chip or by a CMOS sensor chip. The CCD technology has the advantage of a higher accuracy. A CMOS sensor, on the other hand, usually is less expensive than the CCD sensor and, moreover, can be combined with signal processing circuitry on the same chip more easily.

In order to generate an image with a spatial resolution, the respective sensor chip comprises an array of photosensitive pixels. An advantageous embodiment for instance uses an 8×8 CCD array. Such a sensor is for instance contained in the integrated TOF imagers from specialized companies.

According to the present invention, the radiation emitting unit comprises at least one light-emitting diode, LED, which represents a particularly efficient and easily controllable way of providing an illumination of the surveillance area. As already mentioned above, the term LED signifies in the context of the present application any radiation emitting diode, irrespective of the emitted wavelength.

Alternatively, also a laser diode or VCSEL (Vertical Cavity Surface Emitting Laser) can be used as the radiation emitting unit. Both have for instance the advantage of covering larger distances.

The signal processing unit according to the present invention may comprise at least one on-chip controller which is monolithically integrated with the first or the second photosensitive element. Thereby firstly a cost effective solution can be provided and secondly the influence of disturbing signals can be reduced.

As an alternative or in addition to such an on-chip controller the signal processing unit may also comprise at least one microcontroller separate from the first and second photosensitive element. The advantage of using an external microcontroller can be seen in the fact that signal processing and storage with much higher performance can be provided compared to an on-chip controller.

The safety photoelectric barrier according to the present invention is intended to replace conventional PAC systems and therefore the arrangement of the transceiver modules which form the light curtain beams has to be a perimeter system with 2, 3, or 4 beams as defined by the international standard EN ISO 13855:2010. This standard defines the height between a reference plane, such as ground, to the first beam of the photoelectric barrier as well as the spacing between the individual beams. For a 2-beam photoelectric barrier, the first beam is arranged 400 mm above the reference plane and the radiation emitting units have to be distanced from each other by 500 mm. In a 3-beam system the distance between each of the three beams has to be 400 mm, the lowest beam being distanced from the reference plane by 300 mm. In a 4-beam arrangement the beams are spaced apart 300 mm, the lowest beam being distanced from the reference plane by 300 mm.

In order to facilitate the installation of a photoelectric barrier according to the present invention, an alignment aid emitting visible light can be provided. The alignment beam can be formed by one of the radiation emitting units by choosing a visible wavelength for the modulated light.

Alternatively, a visible additional laser beam can be provided in addition to the radiation emitting units of the transceiver modules. Using visible light also solves the problem that when not knowing whereto the photoelectric barrier is emitting its radiation, the protective field may be too close to the hazard point. By visibly verifying what object will be used as the reference target, an operator can advantageously confirm the safety distance between the protective field and the hazard point to be guarded.

According to a further advantageous embodiment, a retro-reflective tape or a prismatic reflective element can be used to form the reference target. Such a retro-reflective tape returns more radiation back to the TOF sensor, thereby allowing for greater protective field distances to be achieved. Additionally, the signal is improved and the system has a faster response time compared to diffusely reflecting targets. In particular, the system response time (including the response time of a safety relay) has to be below 80 ms in order to qualify the photoelectric barrier to be used as a SIL3 safety PAC system.

Diffusely reflecting reference targets enhance the likelihood that the light emitted from one beam is reflected back to one or more other radiation detecting units. In particular, at higher operating distances, for example 10 m, such a cross talk between the beams within one housing or belonging to neighboring photoelectric barriers could occur. Consequently, the beams would have to be multiplexed, resulting in an increased response time. By using a prismatic reflective element as the reference target this effect can be eliminated or at least minimized.

Moreover, changes in the ambient temperature cause a drift of the measurement value and lead to errors. According to an advantageous embodiment of the present invention, the photoelectric barrier may comprise an internal temperature sensor to compensate such measurement drifts. In particular, the measured values can be corrected depending on the ambient temperature. The temperature can be measured with a temperature sensing component directly integrated in the first or second photosensitive element, or provided in the region of those components which are most sensitive towards temperature effects, e. g. LEDs.

Furthermore, the present invention relates to a method for monitoring a protective field by means of a safety photoelectric barrier according to the present invention. In particular, the method comprises the steps of emitting radiation from the radiation emitting unit towards a reference target, wherein the protective field is located between the transceiver bar and the reference target. In a second step the radiation incident on the transceiver module and in particular the backscattered radiation from the emitting unit is detected and evaluated regarding a distance information and an intensity information.

A binary output signal is generated which indicates the presence or absence of an object within the protective field. From the binary output signal generated by each of the transceiver modules a safety signal is generated. This safety signal may for instance be used for a safe shut down of a machine to be guarded.

According to the present invention, the radiation detecting unit comprises at least a first and a second photosensitive element so that the step of evaluating the distance and intensity information is performed independently by two redundant photosensitive elements.

By evaluating both the distance and the amplitude value of each measurement, a high degree of redundancy is introduced which leads to an improved safety integration level of the system as a whole, in particular SIL3.

The main goal of a photoelectric barrier according to the present invention is to detect a person entering a dangerous area. In other words, an abrupt change of the measurement values compared to the values in the memory has to be detected as fast as possible. According to the present invention, a teach-in step is performed at least when powering up the photoelectric barrier. During this teach-in step the distance and intensity information of the reference target is detected and stored as a reference value by the signal processing unit of each transceiver module. When performing the actual measurements in the normal monitoring operating mode (which will also be referred to as the run mode), the measured values are compared to these reference values saved in the memory and the binary output signal is generated based on this comparison.

The advantage of such a teach-in step can be seen in the fact that any arbitrary object at a suitable position can be used as a reference target. For instance, the reference target can be a wall, a part of an enclosure or a fence surrounding a machine to be guarded. According to the present invention, this reference target has to be present for the teach-in step and for every measurement during the normal monitoring operating mode. The intrusion of an object is derived from a changed distance and/or intensity value compared to the reference values.

According to an advantageous embodiment of the present invention, during the teach-in procedure only a closest object is evaluated as the reference target. Radiation reflected by objects outside of the field of view of the reference target is disregarded. Various algorithms can be employed during teach-in procedure in order to identify the closest object. For instance, only those pixels of a TOF chip which are identified as representing the reference target can be identified during the teach-in procedure and will then be used for determining an intrusion of an object. In this manner backgrounds or objects moving in the area next to or behind the reference target can easily be disregarded.

For a safety photoelectric barrier that has to meet strict safety requirements it is essential that the accuracy of the measurement values is high enough. Consequently, it is advantageous to compensate temperature influences on the measurement values. By providing an internal temperature sensor the measured values can be corrected depending on the ambient temperature. Thus, a drift of the measurement values can be eliminated.

Furthermore, the measured values of the reference target may also exhibit a long-term drift, both regarding the distance values and the intensity values. Such long-term changes in the measurement values of the reference target may cause false tripping of the safety signal. Advantageously, an algorithm can be implemented that compensates for long-term slow changes to either the distance or the intensity values or both. For instance, the compensation algorithm will allow new reference target values to be stored in the memory without going through the teach-in step. Thereby the effect of changing target characteristics, e. g. due to pollution, dust or the like, can be compensated.

According to the advantageous embodiment, during the teach-in procedure and the run mode the modulation frequency, the integration time and the phase delay can be varied for test purposes in order to check the integrity of the photoelectric barrier.

Multipath reflections cause errors in the measurement values and therefore have to be eliminated. By using different radiation pulse frequencies and/or amplitudes, such multipath reflections can be detected because they have different effects for different frequencies.

The accompanying drawings are incorporated into and form a part of the specification to illustrate several embodiments of the present invention. These drawings together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention.

BRIEF DESCRIPTION OF THE DRAWINGS

Further features and advantages will become apparent from the following more particular description of the various embodiments of the invention, as illustrated in the accompanying drawings, in which like references refer to like elements, and wherein:

FIG. 1 shows a schematic representation of a perimeter access control system with two beams according to EN ISO 13855:2010;

FIG. 2 shows a schematic representation of a perimeter access control system with three beams according to EN ISO 13855:2010;

FIG. 3 shows a schematic representation of a perimeter access control system with four beams according to EN ISO 13855:2010;

FIG. 4 shows a schematic representation of the arrangement of FIG. 1 illustrating the radiation paths;

DETAILED DESCRIPTION OF THE PREFERRED EMBODIMENT

Figure 5:
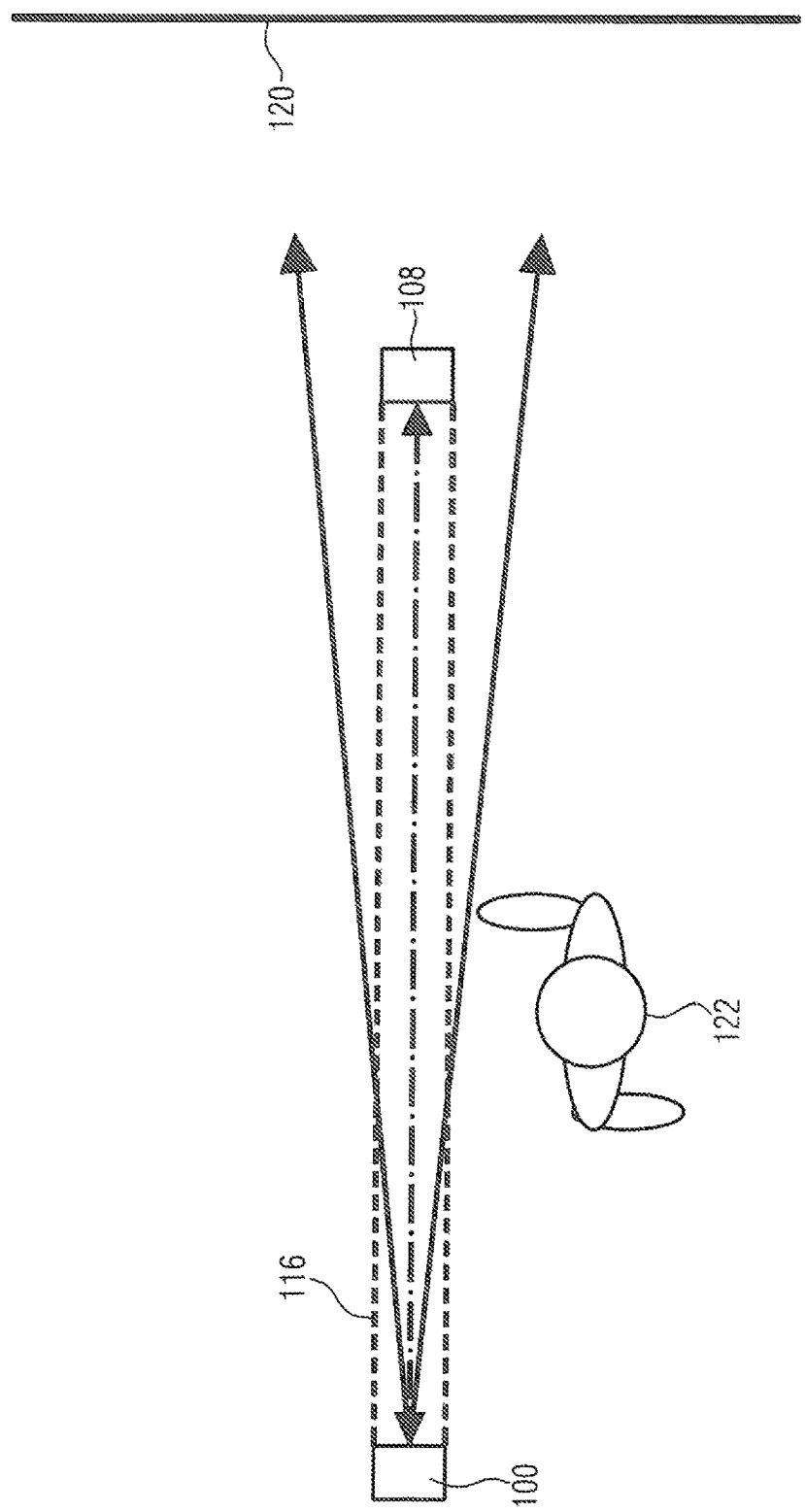
FIG. 5 shows a top view onto the arrangement of FIG. 4.

The present invention will now be explained in more detail with reference to the Figures.

FIG. 1 shows a schematic representation of a photoelectric barrier 100 for monitoring a protective field. According to the present invention, the photoelectric barrier 100 is formed by a single-sided transceiver bar that is based on the time-of-flight principle.

In the embodiment of FIG. 1, the photoelectric barrier 100 comprises a housing 102 with two transceiver modules 104. Each of the transceiver modules 104 comprises a radiation emitting unit, for instance an LED, which emits a radiation beam 106 towards a reference target 108. The reference target 108 according to the present invention can be formed by any arbitrary object which is located at the desired distance, e. g. side walls of enclosures of the guarded machine or fence posts.

In the arrangement shown in FIG. 1 the photoelectric barrier 100 is used to form a perimeter access control (PAC) barrier.

Conventional PAC safety light curtains are quite common in the marketplace. Their position with respect to a reference plane 110 (such as ground) and the distances of the individual monitoring beams 106 are for instance specified by the international standard EN ISO 13855:2010. These products typically monitor the entrance area to a machine and prevent the machine from operating when a person enters the machine area. PAC barriers are built as 2-, 3-, and 4-beam systems, wherein FIG. 1 depicts the 2-beam version.

Most known system are active-active systems requiring an emitter stick and a receiver stick to be individuality mounted, aligned and connected to a power supply. One side is connected to a safety relay or a safety logic controller.

Other known concepts use active-passive systems, where one "active" emitter/receiver stick is mounted on one side of a machine entrance area and a "passive" mirror assembly is provided on the other side. An advantage of this technology can be seen in the fact that only one stick has to be connected to the power supply and the safety relay. However, mounting and alignment are similar to the active-active solution in that both sides still, need to be mounted and adjusted. This single stick solution is less expensive and the electrical installation time is reduced compared to the active-active system.

In contrast thereto, the photoelectric barrier according to the present invention does not require a defined passive mirror side, but works with any arbitrary reference target which is located at a suitable position. Each beam 106 of the photoelectric barrier 100 is based on the time-of-flight (TOF) technology and measures the distance to the object on the other side of the entrance area. This object may for instance be a wall, a part of an enclosure, or a fence.

Therefore, no alignment of a passive or active element at the other side is necessary. Consequently, the costs for acquiring and installing such a photoelectric barrier for PAC can significantly be reduced.

Of course, it is clear for a person skilled in the art that in combination with the photoelectric barrier 100 also a retroreflective tape or a prismatic reflective element can be used as the reference target 108. This can be advantageous for cases where no suitable reference target is available to form a PAC system with the photoelectric barrier 100, or where the reference target has a reflectivity which is too low for reflecting sufficient radiation.

As already mentioned, standard PAC systems shown in FIGS. 1 to 3 comprise 2, 3 or 4 beams 106. The respective beam separation distances are specified to be 500 mm, 400 mm or 300 mm according to the standard EN ISO 13855: 2010, Table E.1.

According to the present invention, the transceiver modules 104 are arranged in the housing 102 to form radiation beams 106 confirming to one of these standard separations. Each transceiver module 104 transmits radiation towards the reference target 108 at the other side of the area to be monitored. The reflected radiation is detected and the distance between the single-sided transceiver bar and the reference target is evaluated.

In order to provide a sufficient redundancy, also the grayscale values, i. e. the intensity of the backscattered radiation is evaluated.

After set up and alignment of the inventive photoelectric barrier 100, a teach-in procedure has to be performed. When the teach-in procedure was successful, the PAC system is ready to go into the run mode and the PAC safety outputs can go HIGH. The result of a successful teach-in process will be that the distance and grayscale values of each individual transceiver module will be saved in PAC device memory. Thereafter the system can go to the run mode where it continues to perform distance and intensity measurements. When any measurement deviates from the distance and intensity reference values stored in the PAC device memory the PAC safety outputs will go LOW and thereby stop the dangerous movement of a machine to be guarded.

For instance, the safety outputs can be two safety OSSD outputs. As generally known, the OSSD (Output Signal Switching Device) output is a well-established safe switching output in optoelectronic protective devices (such as safety light curtains or safety laser scanners). If the protective field is interrupted, the safety sensor switches the switching outputs (OSSDs) to the OFF state. This causes the machine or the dangerous state to be switched off. Usually, each safety sensor has two parallel OSSD outputs that have to be evaluated separately from each other (dual-channel), depending on the safety level required.

Turning now to FIG. 4, the configuration according to FIG. 1 is shown in more detail. In particular, each of the transceiver modules 104 comprises a radiation emitting unit 112 and a radiation detecting unit with two photosensitive elements 114. The active diameter of each beam 106 is indicated by the broken lines 116. As already mentioned above, the radiation emitting unit 112 can be an LED, preferably emitting pulsed infrared radiation. However, also laser diodes or LEDs emitting visible radiation can be used.

The radiation emitting unit 112 is sending the radiation beam 106 towards the reference target 108 which optionally may be equipped with a retro-reflective tape 118. However, for most objects close to the guarded area such an additional retro-reflective element will not be necessary because targets with reflective values between 6% and 90% can be detected by a time-of-flight radiation detecting unit without problems.

FIG. 4 also schematically shows the background 120 which is further away from the photoelectric barrier 100 than the reference target 108. The operating range, i.e. the distance between the photoelectric barrier 100 and the reference target 108, advantageously is between 0.5 m and 10 m. However, with a sufficiently strong radiation source 112 and a sufficiently high reflectivity of the surface of the reference target 108 also larger operating ranges can be covered.

The necessary vertical size of the reference target 108 depends on the distance between the radiation beams 106. The horizontal size preferably is at least 4 cm, in order to allow reliable distance measurements for the respective operating range.

As long as none of the beams 106 are interrupted by a person 122, the OSSD outputs of the photoelectric barrier 100 are HIGH and the protected machine can be running. As soon as a person 122 (or any other object) interrupts one or both of the beams 106, the measured values detected by the photosensitive elements 114 of the respective beam 106 differ from the values that have been stored during the teach-in procedure.

Consequently, the transceiver module 104 generates a digital signal indicating that the beam has been interrupted. Consequently, a controller module that is connected to all transceiver modules 104 and to the output of the photoelectric barrier 100 generates a LOW signal at the OSSD outputs of the photoelectric barrier 100. In the same way as with conventional light curtains, this causes the guarded machine to be brought into a safe state, for instance to be shut down.

FIG. 5 shows the situation depicted in FIG. 4 in a top view. As can be seen from this Figure, radiation is not only emitted onto the reference target 108, but also passes the reference target and is directed towards the background 120. The diameter of the active beam is again defined by the broken line 116.

Figure 6:
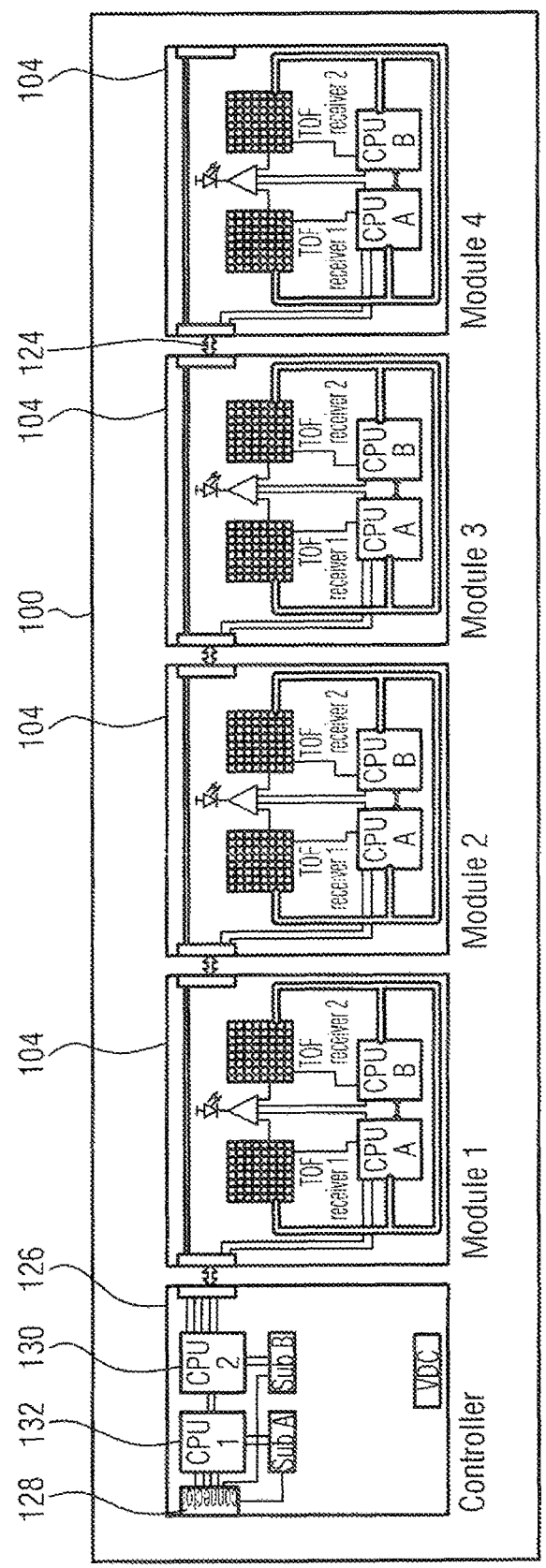
FIG. 6 shows a schematic representation of a safety photoelectric barrier with four beams.

FIG. 6 shows a block diagram of the components forming a photoelectric barrier 100 that is based on the 4-beam arrangement as shown in FIG. 3. The photoelectric barrier 100 comprises four transceiver modules 104. The transceiver modules are connected to each other via a bus system 124, e. g. an SPI (serial peripheral interface) bus. The SPI bus is a synchronous serial communication interface specification used for short distance communication, primarily in embedded systems. SPI devices communicate in full duplex mode using a master-slave architecture with a single master.

The photoelectric barrier 100 further comprises a controller module 126 that communicates with the transceiver modules 104 via said SPI bus 124 and represents the master of the architecture. An edge card connector 128 is provided for connecting the controller unit 126 to the OSSD outputs (not shown in the Figure). In order to provide the necessary redundancy, the controller unit 126 comprises two redundant central processing units (CPU) 130, 132.

Figure 7:
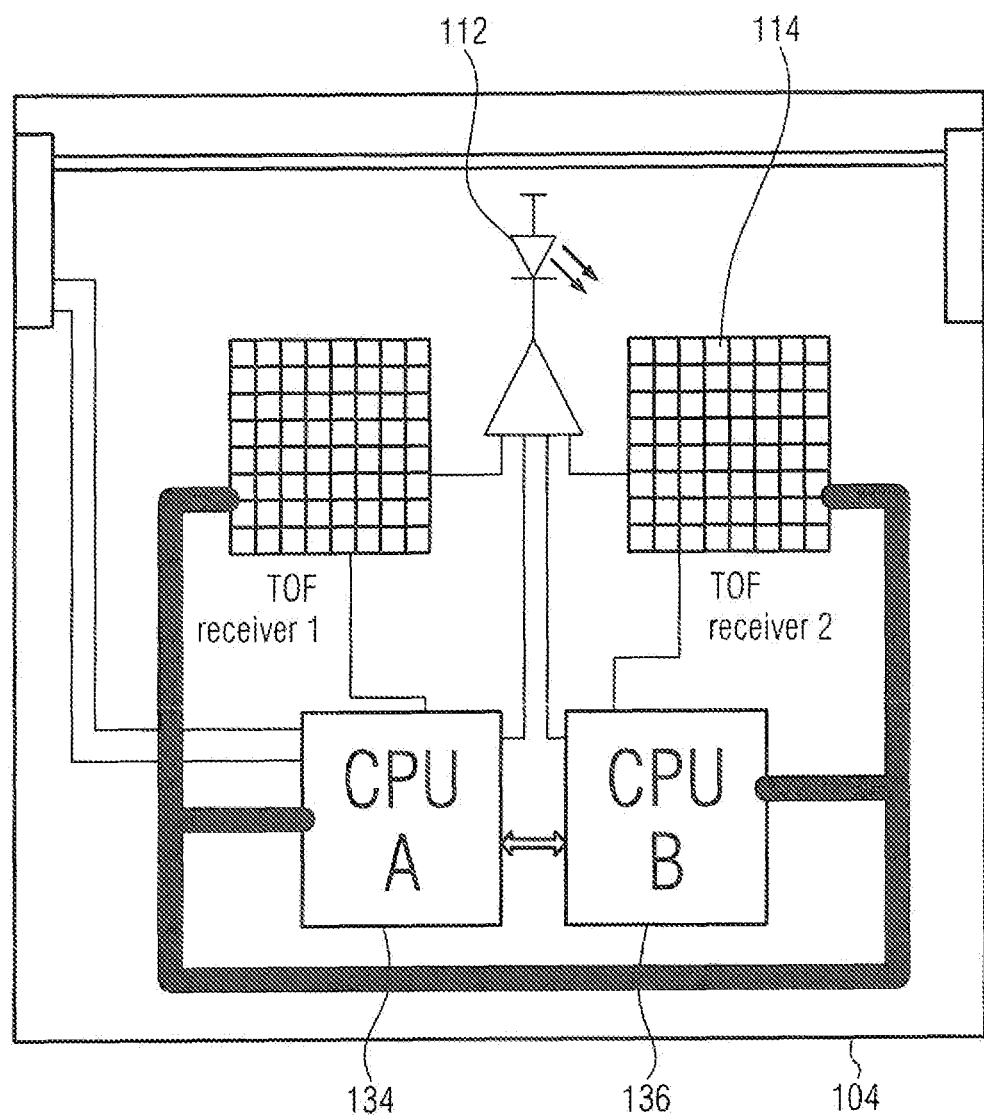
FIG. 7 shows a schematic representation of one transceiver module according to an advantageous embodiment of the present invention.

Each of the transceiver modules 104 is formed identically and FIG. 7 depicts a block diagram of one of the transceiver modules 104 according to the present invention. As shown in FIG. 7, the transceiver module 104 comprises an LED forming a radiation emitting unit 112. Furthermore, two photosensitive elements 114 are provided for detecting the backscattered radiation. According to the present invention, the photosensitive element comprises a charged coupled device (CCD) array which is monolithically integrated with further components, such as an SPI interface, signal processing units, memories, and analog/digital converting means as this is for instance known from some suppliers.

The present invention, however, can also be realized by using other suitable photosensitive elements 114. In the configuration shown in FIG. 7, two central processing units 134, 136 are provided in the transceiver module 104 in order to provide redundancy. In contrast to the redundant CPUs 130, 132 of the controller module 126, however, the transceiver modules 104 do not necessarily have to be equipped with two central processing units 134, 136. The CPUs 134, 136 of the transceiver module 104 control the signal processing during teach-in and are further operable to perform a background suppression during the actual measurement. The photosensitive elements 114 preferably are not operated simultaneously, but in an offset manner.

Firstly, the first of the photosensitive elements 114 is operated to detect the radiation emitted from the LED 112 and scattered back by the reference target. To this end, the LED is controlled to output modulated radiation. This radiation is reflected by the reference target and the returning radiation is sampled by the photosensitive TOF CCD sensor 114. Electronic components integrated within the photosensitive element 114 (see FIG. 9) compare the phase difference between the emitted and the received radiation and compute the time difference of the time-of-flight individually for each pixel.

According to the present embodiment, the pixel of the photosensitive element is one of an 8×8 pixel TOF CCD array. Moreover, also the intensity of the backscattered radiation is evaluated according to the present invention. Thereby a further redundancy is provided in the photoelectric barrier.

While the signal processing is performed for the first of the photosensitive elements 114, the second photosensitive element 114 is selected via the chip select signal CS2 and the measurement cycle is repeated using the second of the photosensitive elements 114.

Hence, a redundant measurement scheme is performed that improves the safety integrity level of the photoelectric barrier according to the present invention.

Figure 8:
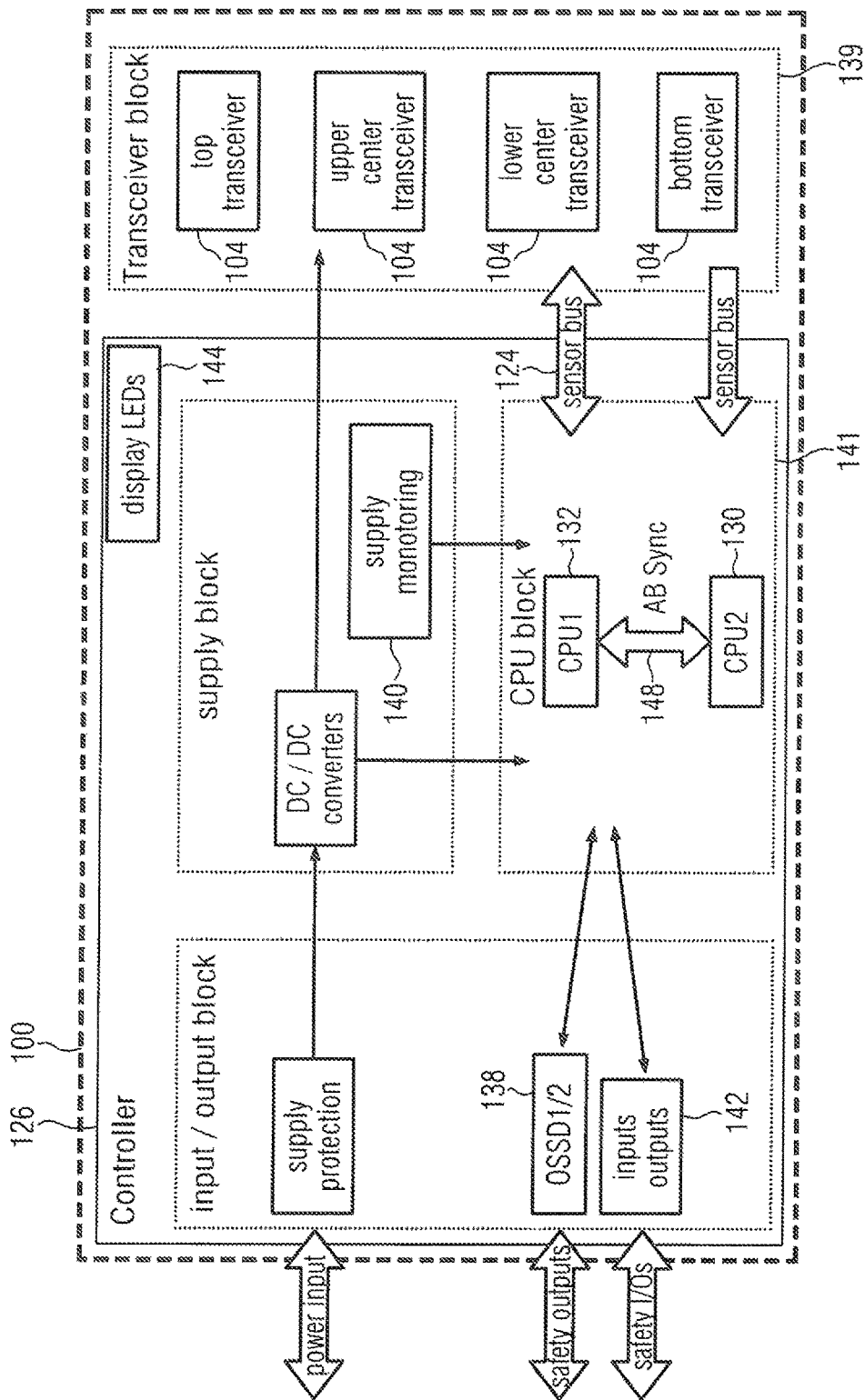
FIG. 8 shows a block diagram of the arrangement of FIG. 6.

FIG. 8 schematically depicts a conceptual overview block diagram of the photoelectric barrier 100 according to the present invention. Safety relevant components are the transceiver block 139 comprising the transceiver modules 104, and the CPU block 141 comprising the CPUs 130, 132 of the controller module 126. Furthermore, also safety outputs OSSD1 and OSSD2 138 and the supply monitoring unit 140 are safety relevant components.

The photoelectric barrier 100 further comprises additional safety inputs and outputs 142 and a user interface with display means 144. Finally, the photoelectric barrier 100 comprises a power supply protection as well as DC/DC converters for providing the necessary electric power at accurate voltages.

FIG. 8 also illustrates the communication between the transceiver block and the CPU block. The CPU block 141 comprises the first and second CPUs 130, 132 provided in the controller module 126 (see FIG. 6). As shown in FIG. 6, only the transceiver module 104 that is closest to the controller module 126 directly communicates with the CPU block. The following transceiver modules are connected to the closest transceiver unit via the sensor bus 124. Apart from that, however, each of the transceiver modules 104 is formed identical to the one shown as the "bottom transceiver".

According to the exemplary embodiment shown in the Figures a TOF integrated imager chip is used as the photosensitive element 114.

This chip integrates several functionalities and also comprises an internal controller. The chip receives the 8.5 V and −5.0 V power supply and internally generates all other required voltages. The data generated by the pixel field are evaluated by an integrated A/D converter. The A/D converter supplies the required pixel data to the TOF chip controller. The internal TOF chip controller furthermore interprets the commands on the sensor bus, organizes the required tasks, evaluates the results, and sends the answers back to the sensor bus. The internal controller furthermore controls the LED illumination together with the pixel field; it receives the TOF chip clock from the connected CPU block and generates the selected modulation frequency. Alternatively, a separate oscillator may be used.

As already mentioned, the CPU block, comprises two CPUs which are connected with each other by the so-called AB sync interface 148. The CPU block is built redundantly and is responsible for the safety of the TOF PAC system. The CPU block as part of the controller module 126 organizes the behavior of the photoelectric barrier 100 in general, the image capturing and evaluation process and all tests and teach-in steps.

Furthermore, the CPUs 130, 132 also perform signal compensation algorithms for a measured TOF chip temperature and for long-term drift effect.

Figure 9:
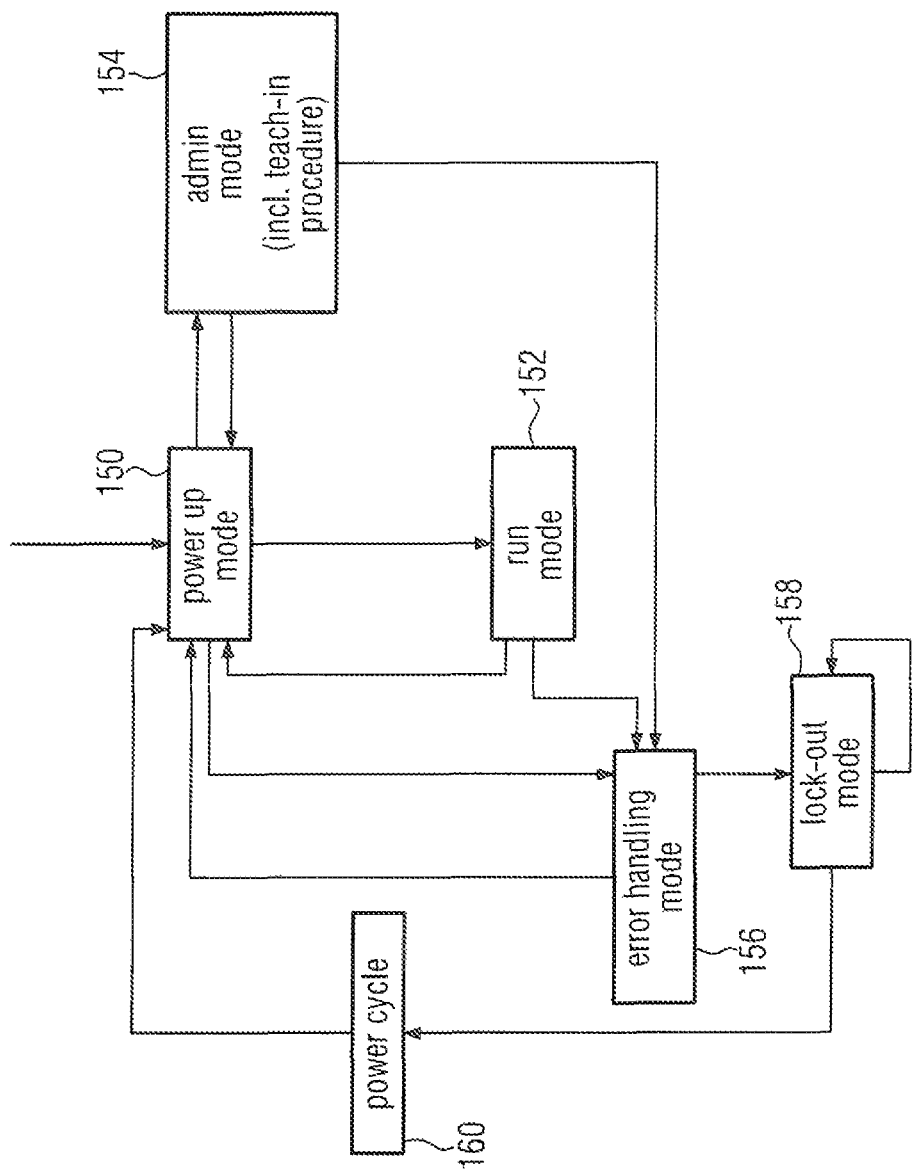
FIG. 9 shows a flow diagram of the operating modes of the photoelectric barrier according to the present invention.

FIG. 9 describes the various operating modes of the photoelectric barrier according to the present invention. The starting mode is the power up mode 150. This mode is entered after the TOF PAC system is energized or after a system reset. It initializes the system and performs all tests. If all the tests are successfully passed, the power up mode is left and the run mode 152 or the administration mode 154 can be entered. Otherwise, in case of faults determined by the tests, the power up mode 150 is left and an error handling mode 156 is entered. The OSSDs are always switched off in the power up mode 150.

During the power up mode 150, all internal and external components are initialized including the transceiver modules. A self test is perforated that also checks the correct switching of the OSSD outputs.

Moreover, the distance and the amplitude of the referenced target are measured and the values are compared with the values measured and stored during the teach-in step. If the measured values are identical to those already stored, the process can proceed to the run mode 152. If at least one of the distance or amplitude values differs from the stored values, the process proceeds to the admin mode 154.

In the run mode 152, the TOF PAC system performs its normal safety function. In particular, the distance to the reference target is measured and the value is compared to the stored value. If the difference between the measured value and the stored value exceeds a predefined range, a signal is generated that causes the OSSD outputs to be switched off. The same comparison is performed for the intensity value. It is important to note that each transceiver module 104 individually generates a digital signal to switch of the OSSD outputs. This signal is provided by the controller module 126 to the OSSD outputs via the sensor bus 124.

In addition to the measurement procedure, the run mode 152 also comprises test sequences. In case the tests are not all successfully passed, the process proceeds to the error handling mode 156.

During the error handling mode 156 the OSSDs are switched off. For a continuous error, the process proceeds to the lockout mode 158, for a non-continuous error the process proceeds to the power up mode 150.

The administration mode ("admin" mode) 154 is needed for performing the teach-in procedure according to the present invention. In the teach-in procedure the reference values of the distance and the amplitude are measured and stored in memory provided in each transceiver module 104. In particular, for performing the teach-in procedure an operator aligns the photoelectric barrier to emit radiation towards a particular reference target which is present at a desired position. The reference target can be a wall, a fence post, a part of the machine enclosure, or the like. According to the present invention, no dedicated reference target is needed. However, after a successful teach-in procedure, the reference target must always stay the same and remain in the same position for all operating modes unless of course a new teach-in procedure is performed. As already mentioned, this alignment procedure can be facilitated by providing a visible light source.

Figure 10:
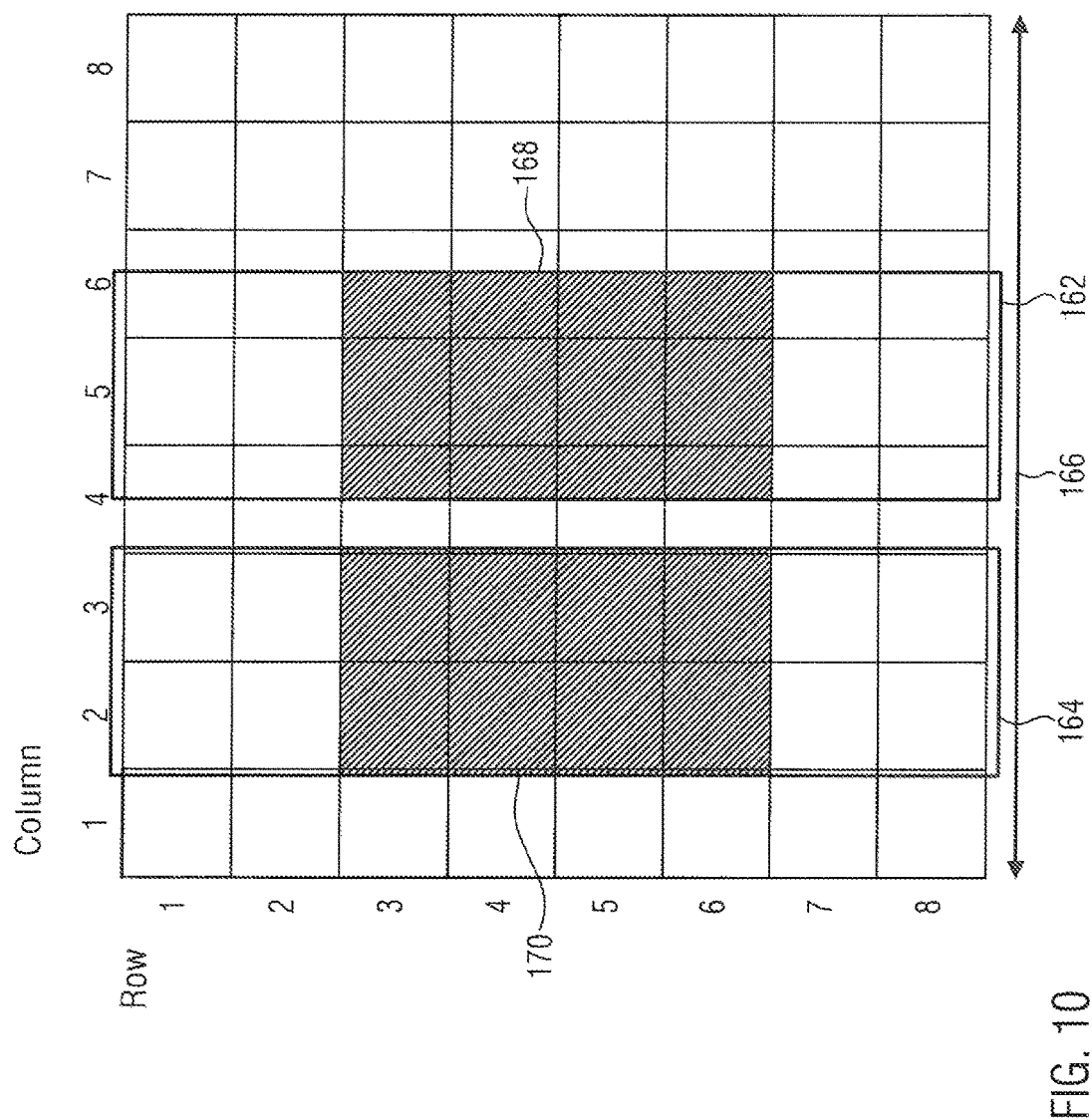
FIG. 10 shows a schematic representation of the reference target size as detected by a radiation detecting unit according to the present invention.

FIG. 10 illustrates the definition of the smallest possible reference target 108 related to the size of the photosensitive element 114. According to the present advantageous embodiment, the photosensitive element 114 is a CCD chip having 64 pixels arranged in 8 columns and 8 rows. Reference numeral 166 illustrates the chip size of the CCD photosensitive component.

In order to make sure that in all positions of the reference target a sufficient measurement signal is generated, at least 4 pixels must be fully covered by the radiation returning from the reference target.

The image 162 symbolizes a first position of the reference target and shows a case where columns 4 and 6 are only half covered by the radiation scattered back from the reference target and only the pixels of column 5 are fully illuminated. For a different geometric relation between the photoelectric barrier and the same reference target also two columns of pixels may be fully illuminated as shown by image 164. The hatched areas 168, 170 indicate the minimal amount of rows that have to be covered by the reflected radiation. In the present exemplary embodiment, four rows have to be illuminated in order to reach the required total of four pixels.

In summary, the present invention provides an improved presence sensing safety product that is cost effective and easy to install and maintain. Moreover, the photoelectric barrier according to the present invention is able to meet the requirements connected with a safety integration level 3.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i. e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e. g. "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. For instance, also more than one radiation emitting unit can be provided.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A safety photoelectric barrier for monitoring a protective field, said photoelectric barrier comprising:
   a single-sided transceiver bar with:
      a housing;
      a plurality of transceiver modules each having a radiation emitting unit emitting radiation towards a reference target, the protective field being located between said transceiver bar and the reference target, a radiation detecting unit detecting radiation incident on the transceiver module, and a signal processing unit evaluating the detected radiation regarding a distance information and an intensity information and for generating a binary output signal indicating the presence or absence of an object within the protective field;
   a controller module evaluating the binary output signals generated by said transceiver modules and generating a safety signal in response to the evaluated output signals; and
   an internal temperature sensor for performing a temperature compensation of said distance and intensity information;
   wherein the radiation detecting unit comprises at least a first and a second photosensitive element redundantly evaluating the distance and intensity information.

2. A safety photoelectric barrier according to claim 1, wherein said radiation detecting unit is operable to calculate said distance information based on a time-of-flight principle, and simultaneously to detect the intensity information of the incident radiation.

3. A safety photoelectric barrier according to claim 2, wherein said distance information is calculated based on a phase shift between the radiation transmitted by the radiation emitting element and the incident radiation.

4. A safety photoelectric barrier according to claim 1, wherein said first and second photosensitive elements each comprise a separate time-of-flight (TOF) device selected from the group consisting of a charge coupled device (CCD) and a CMOS sensor device.

5. A safety photoelectric barrier according to claim 4, wherein each time-of-flight device comprises an array of photosensitive pixels.

6. A safety photoelectric barrier of claim 1 wherein said radiation emitting unit is controlled by said signal processing unit and comprises at least one light emitter selected from the group consisting of a light emitting diode (LED), a laser diode, and a vertical cavity surface emitting laser (VCSEL).

7. A safety photoelectric barrier of claim 1 wherein said signal processing unit comprises at least one on-chip controller monolithically integrated with said first or second photosensitive element.

8. A safety photoelectric barrier of claim 1 wherein said signal processing unit comprises at least one microcontroller separate from said first and second photosensitive element.

9. A safety photoelectric barrier according claim 1 wherein multiple transceiver modules are arranged within said housing with distances between each other that conform to specifications of a standardized perimeter access control (PAC) system.

10. A safety photoelectric barrier according to claim 1 further including at least one of an alignment aid emitting visible light for aligning the photoelectric barrier and a radiation emitting unit operable to emit visible light to be simultaneously used as an alignment aid.

11. A safety photoelectric barrier according claim 1 further comprising at least one of a retro-reflective tape and prismatic reflective element to form said reference target.

12. A method of monitoring a protective field by means of a safety photoelectric barrier, said photoelectric barrier comprising a single-sided transceiver bar with a housing, a plurality of transceiver modules, and a controller module, the transceiver modules each having a radiation emitting unit, a radiation detecting unit, and a signal processing unit, said method comprising the steps of:
- emitting radiation from said radiation emitting unit towards a reference target with an arbitrary reflectivity and geometry, the protective field being located between said transceiver bar and the reference target;
- detecting radiation incident on the transceiver module, and evaluating the detected radiation regarding distance information and intensity information and for generating a binary output signal indicating the presence or absence of an object within the protective field;
- evaluating the binary output signals generated by said transceiver modules and generating a safety signal in response to the evaluated output signals; and
- measuring a temperature of said transceiver modules and performing a temperature compensation of said distance and intensity information;
- wherein the radiation detecting unit comprises at least a first and a second photosensitive element so that the step of evaluating the distance and intensity information is performed independently by two redundant photosensitive elements.

13. A method according to claim 12, further comprising a teach-in step in which the distance and intensity information of said reference target is detected and stored as reference values by said signal processing unit, wherein values measured during a run mode are compared to said reference values for generating the binary output signal indicating the presence or absence of an object within the protective field.

14. A method according to claim 13, wherein the teach-in and the measurement steps are both performed for more than one radiation pulse frequency and/or amplitude.

15. A method according to claim 12 wherein in the teach-in step only a closest object is evaluated as said reference target, and wherein radiation reflected by objects outside of this reference target field of view are ignored.

16. A method according to according to claim 12 further comprising the step of performing a compensation for a long term drift in the measurement values indicating said distance and intensity information.

17. A method according to claim 12 wherein for a system check a modulation frequency of the radiation emitting unit, an integration time and/or a phase delay are varied.

18. A method according to claim 12 wherein different radiation pulse frequencies and/or amplitudes are used for detecting multipath reflections.

* * * * *